United States Patent [19]
Smolinski

[11] Patent Number: 5,528,327
[45] Date of Patent: Jun. 18, 1996

[54] CAMERA VIEWFINDER WITH LEVELING INDICATOR

[75] Inventor: David M. Smolinski, Phelps, N.Y.

[73] Assignee: Eastman Kodak Company, Rochester, N.Y.

[21] Appl. No.: 371,338

[22] Filed: Jan. 11, 1995

[51] Int. Cl.⁶ ................................................. G03B 13/02
[52] U.S. Cl. ............................................................. 354/219
[58] Field of Search ................................................. 354/219

[56] References Cited

U.S. PATENT DOCUMENTS

| | | |
|---|---|---|
| 525,654 | 9/1894 | Hicks . |
| 1,167,967 | 1/1916 | Anderson . |
| 1,964,622 | 6/1934 | Draper . |
| 2,286,810 | 6/1942 | Ingels . |
| 2,505,140 | 4/1950 | Peltz et al. . |
| 2,525,558 | 10/1950 | Mihalyi . |
| 3,602,085 | 8/1971 | Wagner . |
| 4,801,793 | 1/1989 | Vaynshteyn ............... 354/289.12 |

*Primary Examiner*—Monroe H. Hayes
*Attorney, Agent, or Firm*—Roger A. Fields

[57] ABSTRACT

A camera comprises a see-through viewfinder for viewing a subject to be photographed, and a leveling indicator visible in the viewfinder for indicating whether or not the camera is oriented level relative to the subject. The leveling indicator is an optical prism with two similarly-angled front faces which crest at a common boundary to deviate individual light rays reflected from the subject onto the respective front faces towards each other as they emerge at a rear face of the optical prism. Consequently, two images of the subject will be seen through the optical prism which appear to be at the same elevation when the camera is oriented level relative to the subject and appear to be at different elevations when the camera is not oriented level relative to the subject.

4 Claims, 5 Drawing Sheets

CAMERA VIEWFINDER WITH LEVELING INDICATOR

FIELD OF THE INVENTION

The invention relates generally to the field of photography, and in particular to a leveling indicator visible in the viewfinder of a camera for indicating whether the camera is oriented level relative to a subject to be photographed or is tilted relative to the subject. More specifically, the invention relates to the use of an optical prism as the leveling indicator.

BACKGROUND OF THE INVENTION

It is generally known for a leveling indicator to be visible in the viewfinder of a camera for indicating whether the camera is oriented level relative to the subject to be photographed or is tilted relative to the subject.

In some cameras a leveling indicator is visible in the viewfinder in the form of two pointers. When these are in line, the camera is level. In other cameras, the leveling indicator is a pendulum or a spirit level.

SUMMARY OF THE INVENTION

According to the invention a camera comprising a see-through viewfinder for viewing a subject to be photographed, and a leveling indicator visible in the viewfinder for indicating whether or not the camera is oriented level relative to the subject, is characterized in that:

the leveling indicator device has integral means for viewing through the viewfinder two images of the subject which appear to be at the same elevation when the camera is oriented level relative to the subject and appear to be at different elevations when the camera is not oriented level relative to the subject.

More specifically, the leveling indicator is an optical prism with two similarly-angled front faces which crest at a common boundary to deviate individual light rays reflected from the subject onto the respective front faces towards each other as they emerge at a rear face of the optical prism, whereby two images of the subject will be seen through the optical prism which appear to be at the same elevation when the camera is oriented level relative to the subject and appear to be at different elevations when the camera is tilted level relative to the subject.

DETAILED DESCRIPTION OF THE INVENTION

The invention is disclosed as being embodied preferably in a photographic camera. Because the features of a photographic camera are generally known, the description which follows is directed in particular only to those elements forming part of or cooperating directly with the disclosed embodiment. It is to be understood, however, that other elements may take various forms known to a person of ordinary skill in the art.

Figure 1:
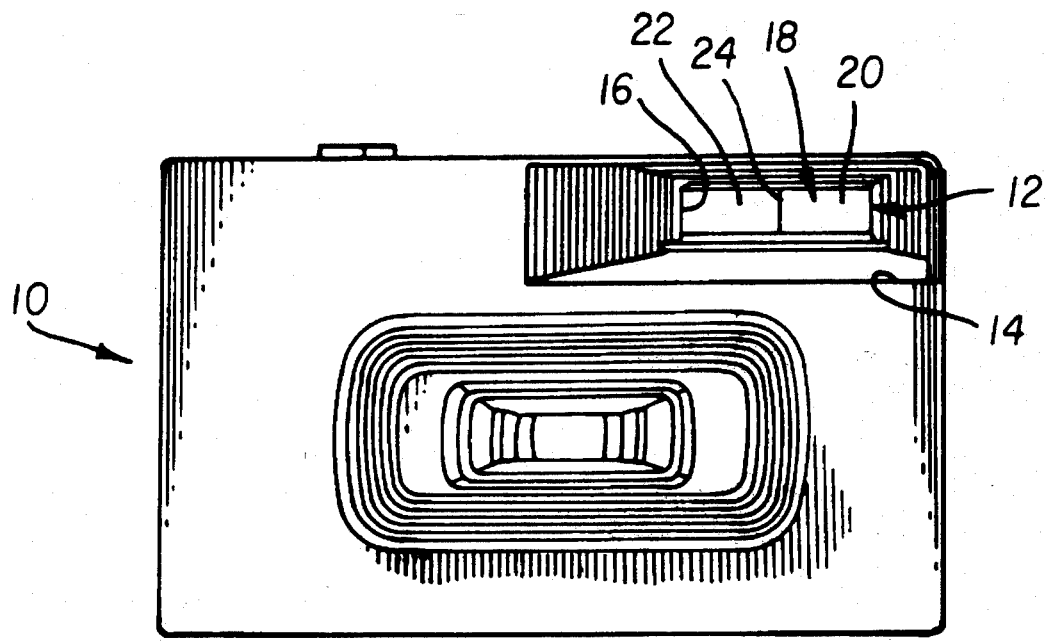
FIG. 1 is a front elevation view of a camera with a level-indicating optical prism located in the viewfinder.
Figure 2:
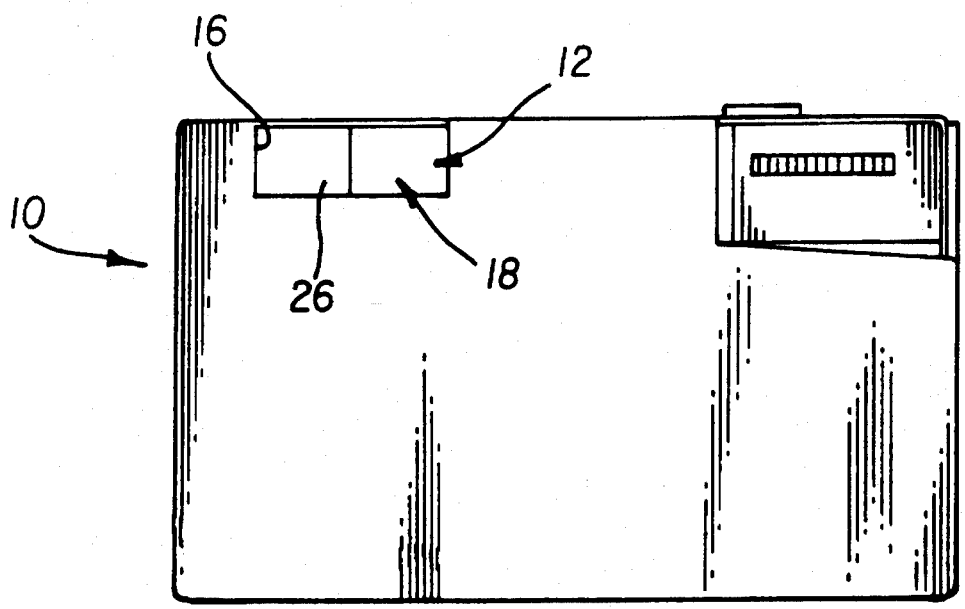
FIG. 2 is a rear elevation view of the camera.
Figure 3:
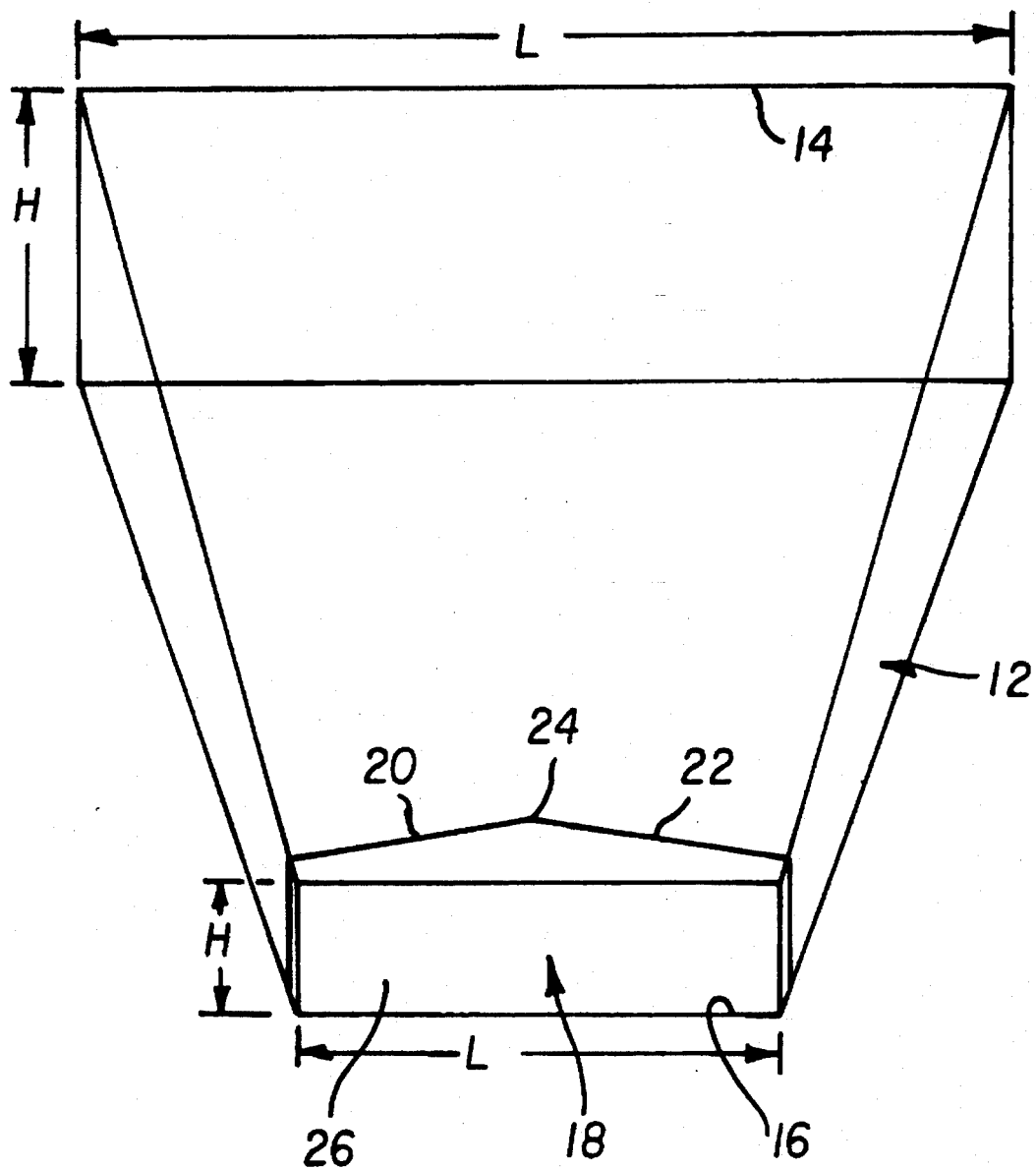
FIG. 3 is a schematic perspective view of the viewfinder including the optical prism.

Referring now to the drawings, FIGS. 1 and 2 show a camera 10 having a commonplace direct see-through viewfinder 12 for viewing a subject to be photographed. The see-through viewfinder 12 is bounded by a front viewfinder opening 14 and a rear or eye viewfinder opening 16. The front viewfinder opening 12 is larger than the rear viewfinder opening 14, and both of them have the same aspect ratio, i.e. the length L—to —height H ratio. As can be seen in FIG. 3, the height H is substantially shorter than the length L.

Figure 4:
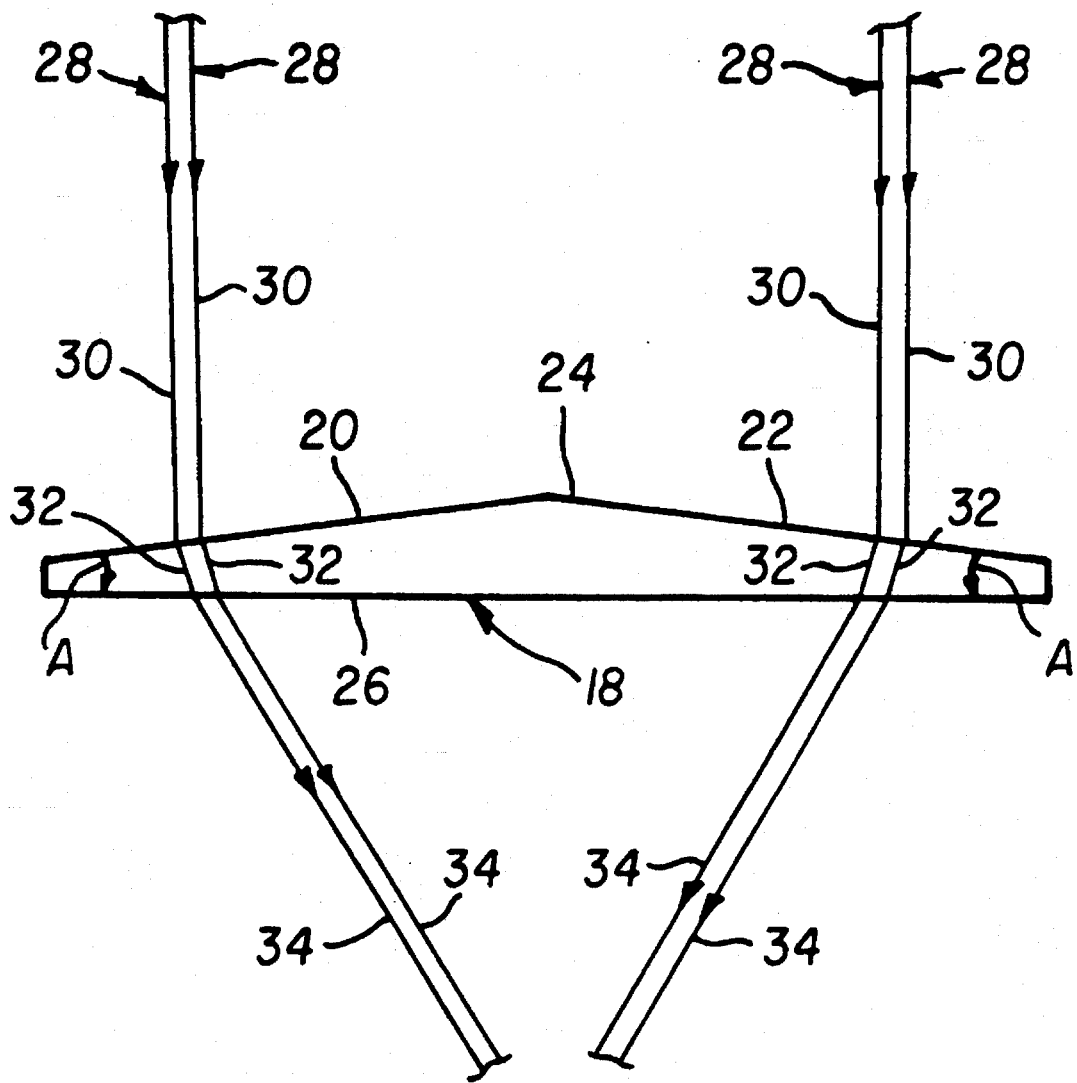
FIG. 4 is a top view of the optical prism showing the ray paths of respective beams of light passing through the prism.
Figure 5:
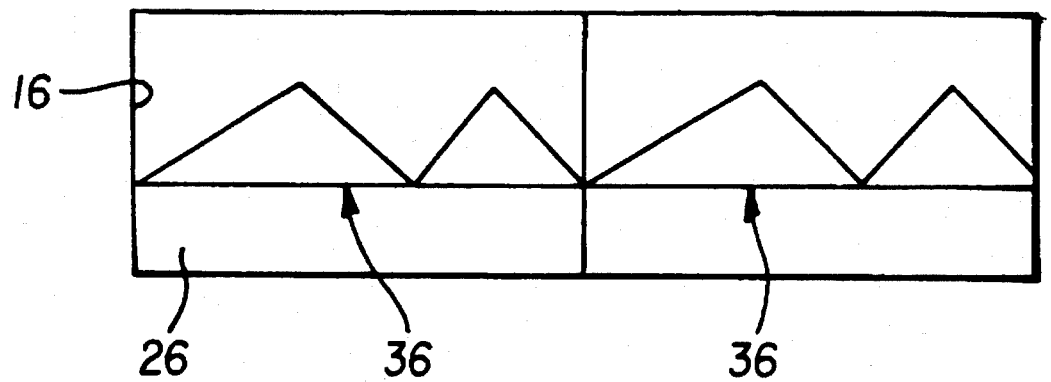
FIG. 5 is a rear elevation view of the optical prism showing two identical images of a subject seen through the viewfinder when the camera is oriented level relative to the subject.
Figure 6:
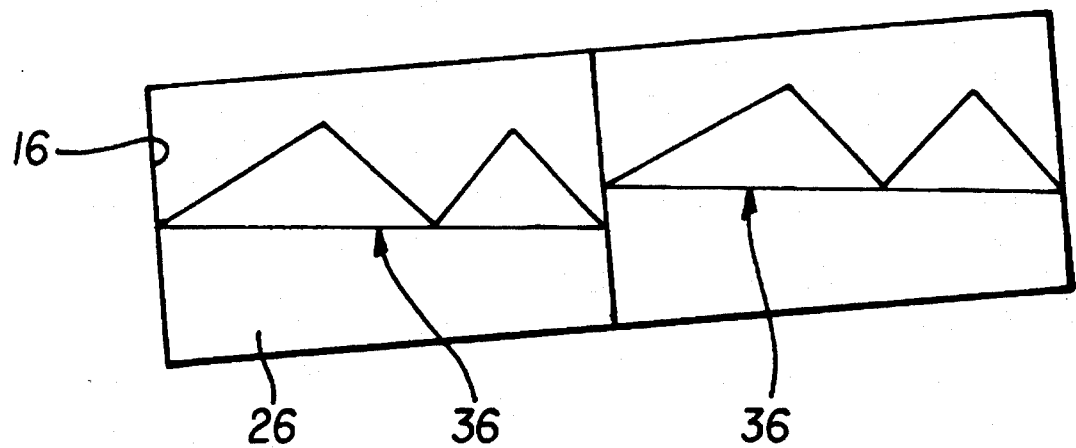
FIG. 6 is a rear elevation view of the optical prism showing two identical images of a subject seen through the viewfinder when the camera is tilted relative to the subject.

A leveling indicator visible in the see-through viewfinder 12 for indicating whether or not the camera 10 is oriented level relative to the subject, is an optical prism 18 located within the rear viewfinder opening 16. See FIGS. 1–3. As shown in FIG. 4, the optical prism 18 is a transparent triangular-shaped body having two similarly-angled equal-length front faces 20 and 22 which crest or meet end-to-end at a common boundary or mid-line 24 and a rear base face 26 which extends between opposite ends of the angled front faces. The two angled front faces 20 and 22 form identical acute angles A with the rear face 26, preferably within the range of 2–5 degrees. Individual light rays 28 reflected from the subject onto the respective front faces 20 and 22 are transmitted through the optical prism 18 and emerge at the rear face 26 deviated towards each other. Each of the light rays 28 consists of an incident ray 30 impinged onto one of the front faces 20 and 22, a refracted ray 32 passing through the optical prism 18, and an emerging ray 34 exiting at the rear face 26. Consequently, two identical images 36 of the subject will be seen through the optical prism 18 which appear to be at the same elevation when the camera 10 is oriented level relative to the subject, as shown in FIG. 5, and appear to be at different elevations when the camera is tilted relative to the subject, as shown in FIG. 6.

Figure 7:
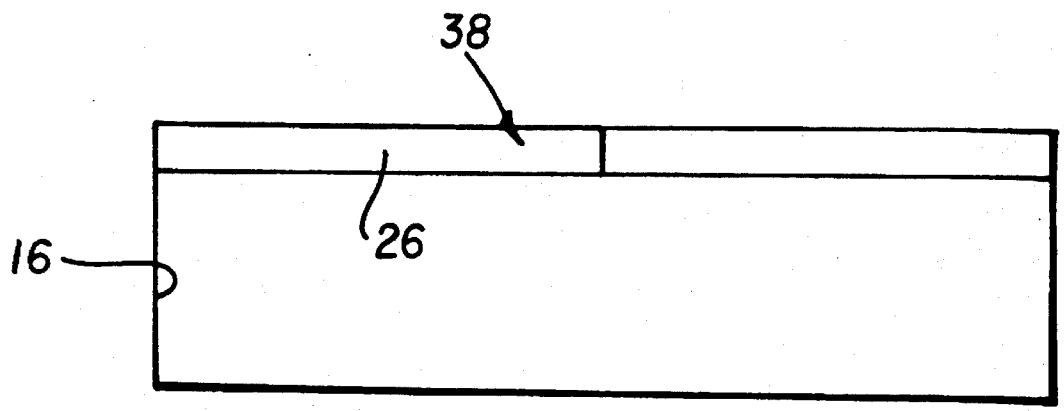
FIGS. 7 and 8 are front elevation views of the viewfinder with alternative prisms.
Figure 8:
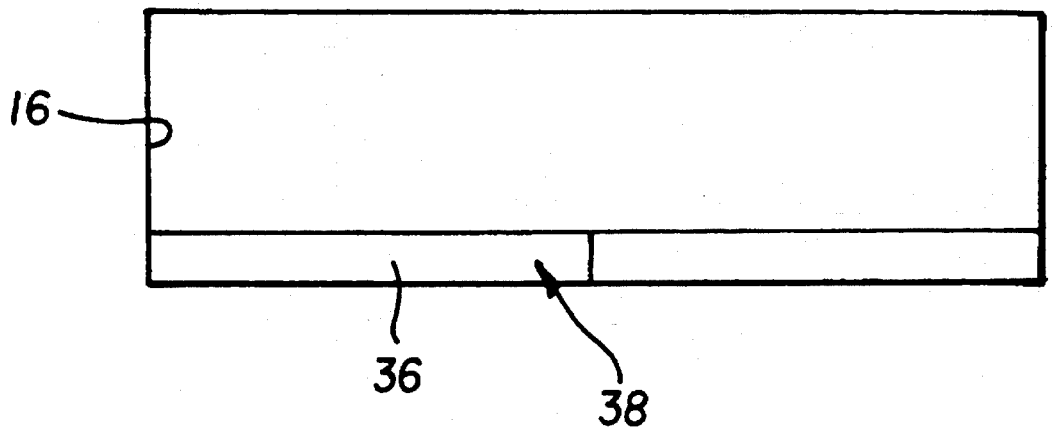

FIG. 7 shows an alternative optical prism 38 located within the rear viewfinder opening 16 only along a top-most section of the rear opening, as compared to the optical prism 18 which occupies the entire opening. FIG. 8 shows the alternative optical prism 38 located within the rear viewfinder opening 16 only along a bottom-most section of the rear opening. The alternative prism 38 is similar to the optical prism 18 except for its height.

The invention has been described with reference to a preferred embodiment. However, it will be appreciated that variations and modifications can be effected by a person of ordinary skill in the art without departing from the scope of the invention.

PARTS LIST 10. camera
12. viewfinder
14. front viewfinder opening
16. rear viewfinder opening
18. optical prism
20 & 22. angled front faces 24. mid-line
26. rear face
28. light rays
30. incident ray
32. refracted ray
34. emerging ray
36. identical images
38. alternative prism
L. length
H. height
A. acute angles

I claim:

1. A camera comprising a see-through viewfinder for viewing a subject to be photographed, and a leveling indicator visible in said viewfinder for indicating whether or not said camera is oriented level relative to the subject, is characterized in that:

said leveling indicator device has integral means for viewing through said viewfinder two images of the subject which appear to be at the same elevation when said camera is oriented level relative to the subject and appear to be at different elevations when the camera is not oriented level relative to the subject.

2. A camera comprising a see-through viewfinder for viewing a subject to be photographed, and a leveling indicator visible in said viewfinder for indicating whether or not said camera is oriented level relative to the subject, is characterized in that:

said leveling indicator is an optical prism with two similarly-angled front faces which crest at a common boundary to deviate individual light rays reflected from the subject onto said respective front faces towards each other as they emerge at a rear face of said optical prism, whereby two images of the subject will be seen through said optical prism which appear to be at the same elevation when said camera is oriented level relative to the subject and appear to be at different elevations when the camera is not oriented level relative to the subject.

3. A camera viewfinder as recited in claim 2, wherein said viewfinder defines a viewing frame having a predetermined length and a height that is shorter than the length, and said optical prism occupies at least a relatively large portion of the length of said viewing frame and only a relatively small portion of the height of the viewing frame.

4. A camera viewfinder as recited in claim 2, wherein said two angled front faces of the optical prism are inclined with respect to said rear face of the optical prism at identical acute angles within the range of 2–5 degrees.

* * * * *